(12) United States Patent
Togashi

(10) Patent No.: US 8,233,262 B2
(45) Date of Patent: Jul. 31, 2012

(54) MULTILAYER CAPACITOR ARRAY MOUNTING STRUCTURE

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 64 days.

(21) Appl. No.: 12/824,669

(22) Filed: Jun. 28, 2010

(65) Prior Publication Data

US 2011/0032655 A1 Feb. 10, 2011

(30) Foreign Application Priority Data

Aug. 5, 2009 (JP) ................... 2009-182558

(51) Int. Cl.
*H01G 4/30* (2006.01)
(52) U.S. Cl. ................... 361/301.4; 361/301.2; 361/303; 361/306.1; 361/306.3; 361/321.2
(58) Field of Classification Search ............... 361/301.4, 361/301.2, 311–313, 306.1, 306.3, 321.1, 361/321.2, 303–305
See application file for complete search history.

(56) References Cited

U.S. PATENT DOCUMENTS

| 7,589,953 B2 | 9/2009 | Togashi et al. |
| 7,636,230 B2 * | 12/2009 | Aoki ............................ 361/303 |
| 2009/0015982 A1 | 1/2009 | Togashi |

FOREIGN PATENT DOCUMENTS

| JP | A-2004-259991 | 9/2004 |
| JP | A-2006-59977 | 3/2006 |
| JP | A-2009-38333 | 2/2009 |
| JP | A-2009-130219 | 6/2009 |

* cited by examiner

*Primary Examiner* — Nguyen T Ha
(74) *Attorney, Agent, or Firm* — Oliff & Berridge, PLC

(57) ABSTRACT

A multilayer capacitor array 1 comprises a capacitor element body 2 having first, second, third, and fourth inner electrodes 13 to 16, and first to fourth terminal electrodes 3 to 6 disposed on the outer surface of the capacitor element body 2 and respectively connected to the inner electrodes 13 to 16. The first and second inner electrodes 13, 14 form a first capacitor section C1, while the third and fourth inner electrodes 15, 16 form a second capacitor section C2. The multilayer capacitor array 1 is mounted to a circuit board such that the first and third terminal electrodes 3, 5 are connected to first leads 22, 23, while the second and fourth terminal electrodes 4, 6 are connected to a second lead 24.

18 Claims, 23 Drawing Sheets

(a)

(b)

(a)

(b)

(a)

(b)

(a)

(b)

(a)

(b)

(a)

(b)

(a)

(b)

MULTILAYER CAPACITOR ARRAY MOUNTING STRUCTURE

BACKGROUND OF THE INVENTION

1. Field of the Invention

The present invention relates to a mounting structure of a multilayer capacitor array having a plurality of capacitor sections.

2. Related Background Art

As a multiple multilayer capacitor array having a plurality of capacitor sections, a multilayer capacitor array comprising a capacitor element body formed by sequentially laminating insulator layers and inner electrodes, and terminal electrodes formed on side faces of the capacitor element body and connected to their corresponding inner electrodes has conventionally been known in general (see, for example, Japanese Patent Application Laid-Open Publication No. 2004-259991).

Meanwhile, two kinds of noise, i.e., differential-mode noise (normal-mode noise) and common-mode noise, have been known to occur in power lines and the like. Conventionally, for eliminating these two kinds of noise, techniques different from each other have been taken respectively, or multilayer capacitor arrays specially designed for removing the two kinds of noise have been used. Hence, no mounting structure has been provided for eliminating these two kinds of noise in power lines by a simple technique such as use of a typical multilayer capacitor array.

SUMMARY OF THE INVENTION

It is an object of the present invention to provide a multilayer capacitor array mounting structure which can easily eliminate two kinds of noise composed of differential-mode noise and common-mode noise by using a single element.

The multilayer capacitor array mounting structure in accordance with the present invention is a structure for mounting a multilayer capacitor array onto a circuit board formed with a first lead connecting power lines to each other and a second lead for grounding. The multilayer capacitor array comprises a capacitor element body having first, second, third, and fourth inner electrodes; a first terminal electrode disposed on an outer surface of the capacitor element body and connected to the first inner electrode; a second terminal electrode disposed on the outer surface of the capacitor element body and connected to the second inner electrode; a third terminal electrode disposed on the outer surface of the capacitor element body and connected to the third inner electrode; and a fourth terminal electrode disposed on the outer surface of the capacitor element body and connected to the fourth inner electrode. In the multilayer capacitor array, the first and second inner electrodes form a first capacitor section, while the third and fourth inner electrodes form a second capacitor section. The first and third terminal electrodes are connected to the first lead, while the second and fourth terminal electrodes are connected to the second lead.

In the multilayer capacitor array mounting structure in accordance with the present invention, the first terminal electrode connected to the first inner electrode forming a part of the first capacitor section and the third terminal electrode connected to the third inner electrode forming a part of the second capacitor section are connected to the first lead, while the second terminal electrode connected to the second inner electrode forming a part of the first capacitor section and the fourth terminal electrode connected to the fourth inner electrode forming a part of the second capacitor section are connected to the second lead. This allows the first and second capacitor sections to function both as a capacitor for eliminating differential-mode noise and a capacitor for eliminating common-mode noise. Therefore, this multilayer capacitor array mounting structure can easily eliminate two kinds of noise composed of differential-mode noise and common-mode noise by using a single element.

Preferably, in the multilayer capacitor array, the first and third terminal electrodes are disposed on the same side face of the capacitor element body. In this case, the respective currents flowing through the first and second capacitor sections in the differential mode are directed opposite to each other, whereby their magnetic fields cancel each other out. This can reduce equivalent series inductance (hereinafter referred to as "ESL").

Preferably, in the multilayer capacitor array, the first and second terminal electrodes are disposed on the same side face of the capacitor element body. In this case, the respective currents flowing through the first and second capacitor sections are directed opposite to each other in the differential mode and further the respective currents flowing from each of the terminal electrodes are directed opposite to each other in the common mode, whereby their magnetic fields cancel each other out. This can further reduce the ESL.

Preferably, in the multilayer capacitor array, the first and second capacitor sections have the same capacitance. In this case, the capacitances in the multilayer capacitor array become symmetrical to each other, whereby the multilayer capacitor array can be mounted, tested, and so forth without taking account of the mounting direction. Here, "the same capacitance" does not mean completely the same, but similar to such an extent as to make it unnecessary to take the mounting direction into consideration when mounting the multilayer capacitor array and so forth, i.e., it means that the first and second capacitor sections have substantially the same capacitance.

Preferably, in the multilayer capacitor array, the capacitor element body further has fifth and sixth inner electrodes, while the multilayer capacitor array further comprises a fifth terminal electrode disposed on the outer surface of the capacitor element body and connected to the fifth inner electrode, and a sixth terminal electrode disposed on the outer surface of the capacitor element body and connected to the sixth inner electrode. The fifth and sixth inner electrodes form a third capacitor section having a capacitance different from that of the first capacitor section in the multilayer capacitor array. The fifth terminal electrode is connected to the first lead, while the sixth terminal electrode is connected to the second lead. In this case, the first and third capacitor sections are connected in parallel, whereby two self-resonant frequencies can be provided. As a result, low impedance can be obtained in a wide band, which makes it possible to eliminate high-frequency noise in the wide band.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the

DESCRIPTION OF THE PREFERRED EMBODIMENTS

In the following, preferred embodiments of the present invention will be explained in detail with reference to the accompanying drawings. In the explanation, the same constituents or those having the same functions will be referred to with the same signs, while omitting their overlapping descriptions.

First Embodiment

Figure 1:
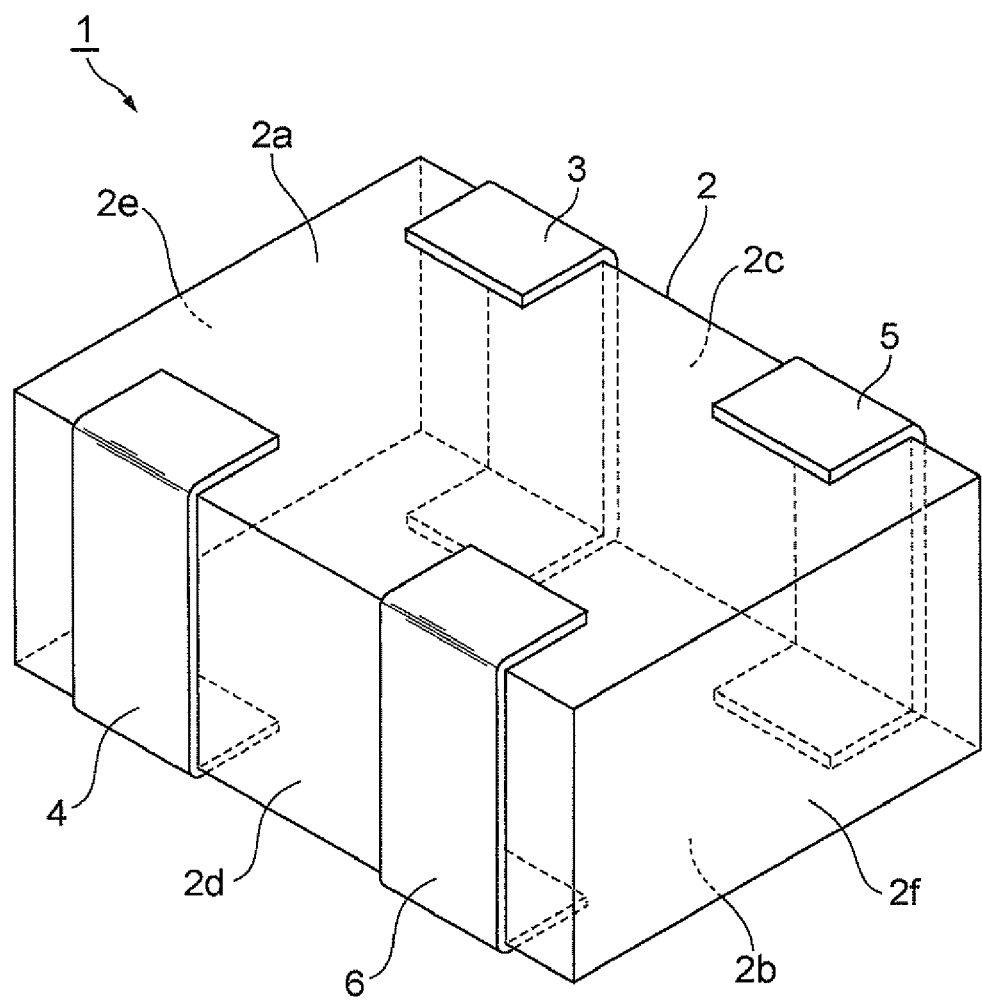
FIG. 1 is a perspective view of a multilayer capacitor array in accordance with a first embodiment.

To begin with, a multilayer capacitor array 1 in accordance with the first embodiment will be explained with reference to FIGS. 1 and 2. As illustrated in FIG. 1, the multilayer capacitor array 1 is a double capacitor array comprising a capacitor element body 2 having a rectangular parallelepiped form and terminal electrodes 3, 4, 5, 6 disposed on the outer surface of the capacitor element body 2. The capacitor element body 2 includes first and second main faces $2a$, $2b$ opposing each other; first and second side faces $2c$, $2d$ opposing each other and extending along longer-side directions of the first and second main faces $2a$, $2b$; and third and fourth side faces $2e$, $2f$ opposing each other and extending along shorter-side directions of the first and second main faces $2a$, $2b$. The first and second side faces $2c$, $2d$ and third and fourth side faces $2e$, $2f$ extend such as to connect the first and second main faces $2a$, $2b$ to each other.

The first and third terminal electrodes 3, 5 are disposed on the first side face $2c$ of the capacitor element body 2. The first and third terminal electrodes 3, 5 are located in this order in the direction from the third side face $2e$ to the fourth side face $2f$. The second and fourth terminal electrodes 4, 6 are formed on the second side face $2d$ of the capacitor element body 2. The second and fourth terminal electrodes 4, 6 are located in this order in the direction from the third side face $2e$ to the fourth side face $2f$. The first and second terminal electrodes 3, 4 oppose each other in a direction in which the first and second side faces $2c$, $2d$ oppose each other. The third and fourth terminal electrodes 5, 6 oppose each other in the direction in which the first and second side faces $2c$, $2d$ oppose each other.

The first to fourth terminal electrodes 3, 4, 5, 6 are formed, for example, by applying and burning a conductive paste containing a conductive metal powder and glass frit onto the outer surface of the capacitor element body 2. Plating layers may be formed on the burned electrodes when necessary. Other terminal electrodes which will be explained later are formed similarly.

Figure 2:
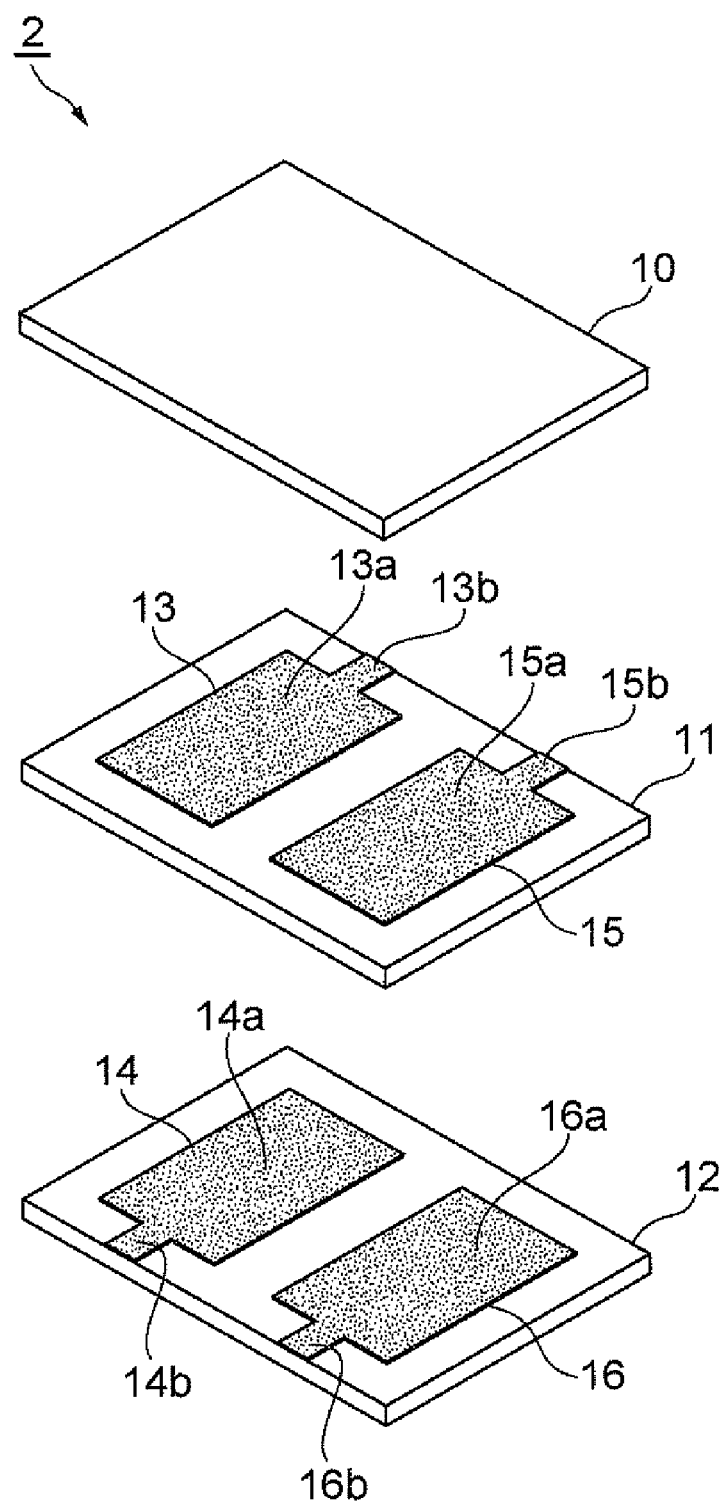
FIG. 2 is an exploded perspective view of a capacitor element body included in the multilayer capacitor array in accordance with the first embodiment.

As illustrated in FIG. 2, the capacitor element body 2 has insulator layers 10, 11, 12 and inner electrodes 13, 14, 15, 16. The insulator layers 10 to 12 extend in directions parallel to the first and second main faces $2a$, $2b$ and are laminated in the direction in which the first and second main faces $2a$, $2b$ oppose each other. That is, the direction in which the first and second main faces $2a$, $2b$ oppose each other is the laminating direction of the insulator layers 10 to 12. Each of the insulator layers 10 to 12 is constituted by a sintered body of a ceramic green sheet containing a dielectric ceramic, for example. In the actual multilayer capacitor array 1, the insulator layers 10 to 12 are integrated to such an extent that their boundaries are indiscernible. Each of the inner electrodes 13 to 16 is constituted by a sintered body of a conductive paste. Other inner electrodes which will be explained later are formed similarly.

Figure 3:
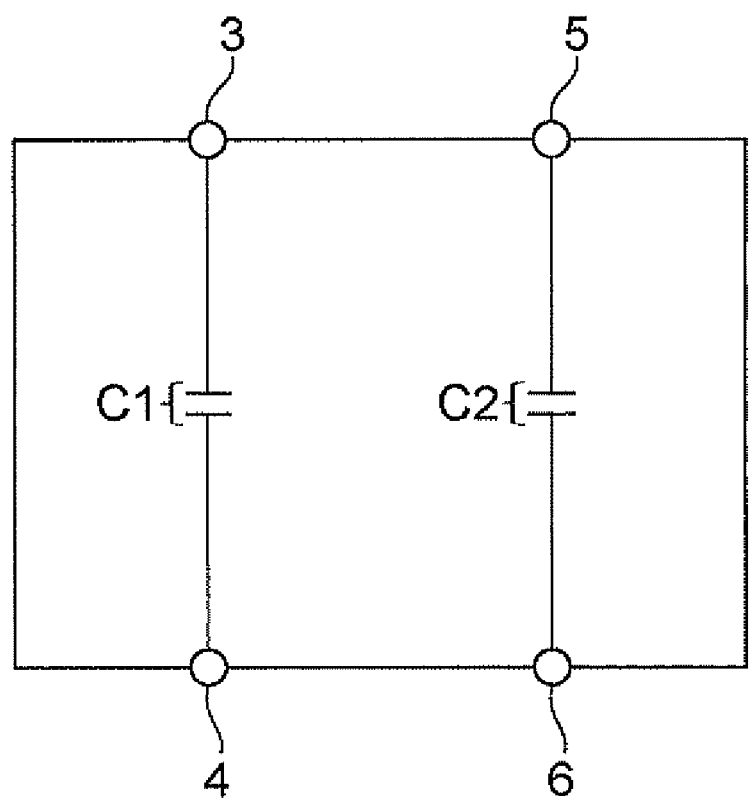
FIG. 3 is an equivalent circuit diagram of the multilayer capacitor array in accordance with the first embodiment.

The first and second inner electrodes 13, 14 are arranged such as to oppose each other through the insulator layer 11 interposed therebetween, and faun a first capacitor section C1 (see FIG. 3). The third and fourth inner electrodes 15, 16 are disposed such as to oppose each other through the insulator layer 11 interposed therebetween, and form a second capacitor section C2 (see FIG. 3). In this embodiment, the first and second capacitor sections C1, C2 have the same capacitance. Here, "the same capacitance" does not mean completely the same, but similar to such an extent as to make it unnecessary to take the mounting direction into consideration at the time of mounting, testing, and so forth of the multilayer capacitor array 1, i.e., it means that the first and second capacitor sections C1, C2 have substantially the same capacitance.

The first and third inner electrodes 13, 15 are formed on the insulator layer 11. The first and third inner electrodes 13, 15 are arranged in a row while having a predetermined gap therebetween such as to be electrically insulated from each other in the direction in which the third and fourth side faces 2e, 2f oppose each other. The second and fourth inner electrodes 14, 16 are formed on the insulator layer 12. The second and fourth inner electrodes 14, 16 are arranged in a row while having a predetermined gap therebetween such as to be electrically insulated from each other in the direction in which the third and fourth side faces 2e, 2f oppose each other.

The first inner electrode 13 includes a rectangular main electrode part 13a and a lead part 13b extending from the main electrode part 13a such as to reach the first side face 2c. The second inner electrode 14 includes a rectangular main electrode part 14a and a lead part 14b extending from the main electrode part 14a such as to reach the second side face 2d. The main electrode parts 13a, 14a oppose each other over substantially the whole surface through the insulator layer 11 in the laminating direction. The lead part 13b is drawn to the first side face 2c and connected to the first terminal electrode 3 electrically and physically. The lead part 14b is drawn to the second side face 2d and connected to the second terminal electrode 4 electrically and physically.

The third inner electrode 15 includes a rectangular main electrode part 15a and a lead part 15b extending from the main electrode part 15a such as to reach the first side face 2c. The fourth inner electrode 16 includes a rectangular main electrode part 16a and a lead part 16b extending from the main electrode part 16a such as to reach the second side face 2d. The main electrode parts 15a, 16a oppose each other over substantially the whole surface through the insulator layer 11 in the laminating direction. The lead part 15b is drawn to the first side face 2c and connected to the third terminal electrode 5 electrically and physically. The lead part 16b is drawn to the second side face 2d and connected to the fourth terminal electrode 6 electrically and physically. The multilayer capacitor array 1 having such a structure is represented by the equivalent circuit diagram illustrated in FIG. 3.

Figure 4:
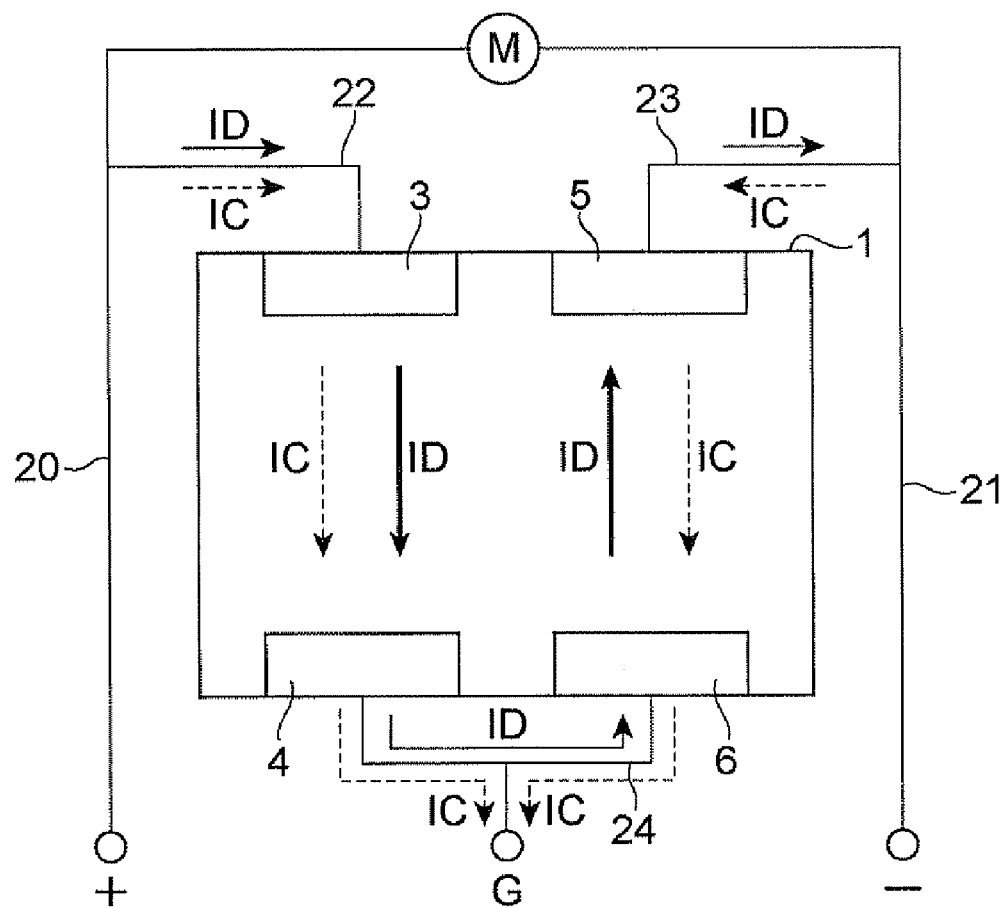
FIG. 4 is a diagram illustrating an example in which the multilayer capacitor array in accordance with the first embodiment is mounted to a circuit board.

A mounting structure in which the multilayer capacitor array 1 is mounted to a circuit board will now be explained. As illustrated in FIG. 4, the circuit board is formed with a pair of power lines 20, 21 for supplying a current to a device M, first leads 22, 23 connecting the power lines 20, 21 to each other, and a second lead 24 for grounding.

Figure 5:
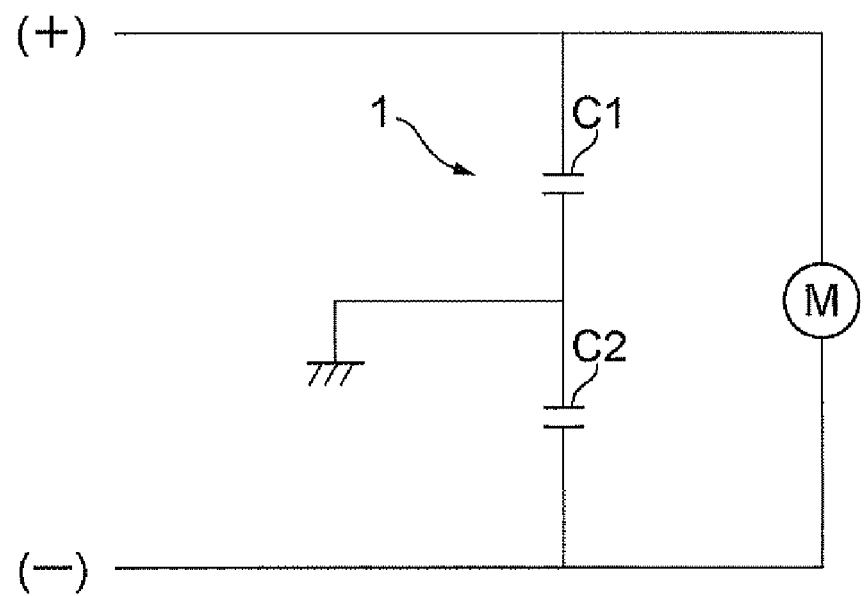
FIG. 5 is an equivalent circuit diagram in the case where the multilayer capacitor array is connected to the circuit board as illustrated in FIG. 4.

In this embodiment, when mounting the multilayer capacitor array 1 onto the circuit board, the first terminal electrode 3 is connected to the first lead 22, the second terminal electrode 4 is connected to the second lead 24, the third terminal electrode 5 is connected to the first lead 23, and the fourth terminal electrode 6 is connected to the second lead 24. That is, in this mounting structure, the first and third terminal electrodes 3, 5 disposed on the same side face 2c are connected to the first leads 22, 23 connecting the power lines 20, 21 to each other, while the second and fourth terminal electrodes 4, 6 disposed on the same side face 2d are connected to the second lead 24 for grounding. These connections mount the multilayer capacitor array 1 in parallel with the device M as illustrated in the equivalent circuit diagram of FIG. 5.

In the differential mode in the multilayer capacitor array 1 mounted as mentioned above, as illustrated in FIG. 4, a current ID flows through the first capacitor section C1 from the first terminal electrode 3 to the second terminal electrode 4 and through the second capacitor section C2 from the fourth terminal electrode 6 to the third terminal electrode 5. In the common mode, on the other hand, a current IC flows through the first capacitor section C1 from the first terminal electrode 3 to the second terminal electrode 4 and through the second capacitor section C2 from the third terminal electrode 5 to the fourth terminal electrode 6.

As in the foregoing, the mounting structure for the multilayer capacitor array 1 in accordance with this embodiment is constructed such that the first terminal electrode 3 connected to the first inner electrode 13 forming a part of the first capacitor section C1 and the third terminal electrode 5 connected to the third inner electrode 15 forming a part of the second capacitor section C2 are connected to the first leads 22, 23, while the second terminal electrode 4 connected to the second 25 in inner electrode 14 forming a part of the first capacitor section C1 and the fourth terminal electrode 6 connected to the fourth inner electrode 16 forming a part of the second capacitor section C2 are connected to the second lead 24.

Therefore, in the differential mode, the current ID flows through the first capacitor section C1 from the first terminal electrode 3 to the second terminal electrode 4 and through the second capacitor section C2 from the fourth terminal electrode 6 to the third terminal electrode 5. In the common mode, on the other hand, the current IC flows through the first capacitor section C1 from the first terminal electrode 3 to the second terminal electrode 4 and through the second capacitor section C2 from the third terminal electrode 5 to the fourth terminal electrode 6. This allows the first and second capacitor sections C1, C2 to function both as a capacitor for eliminating differential-mode noise and a capacitor for eliminating common-mode noise. Therefore, the mounting structure for the multilayer capacitor array 1 can easily eliminate two kinds of noise composed of differential-mode noise and common-mode noise by using a single element.

In the multilayer capacitor array 1, the first and third terminal electrodes 3, 5 are disposed on the side face 2c of the capacitor element body 2, while the second and fourth terminal electrodes 4, 6 are disposed on the side face 2d of the capacitor element body 2. Therefore, the current ID has respective directions opposite to each other when flowing through the first and second capacitor sections C1, C2, whereby the resulting magnetic fields cancel each other out, which can reduce the ESL.

In the multilayer capacitor array 1, the first and second capacitor sections C1, C2 have the same capacitance. This yields symmetrical capacitances in the multilayer capacitor array 1, whereby the multilayer capacitor array 1 can be mounted, tested before shipping, and so forth without taking account of the mounting direction.

Figure 6:
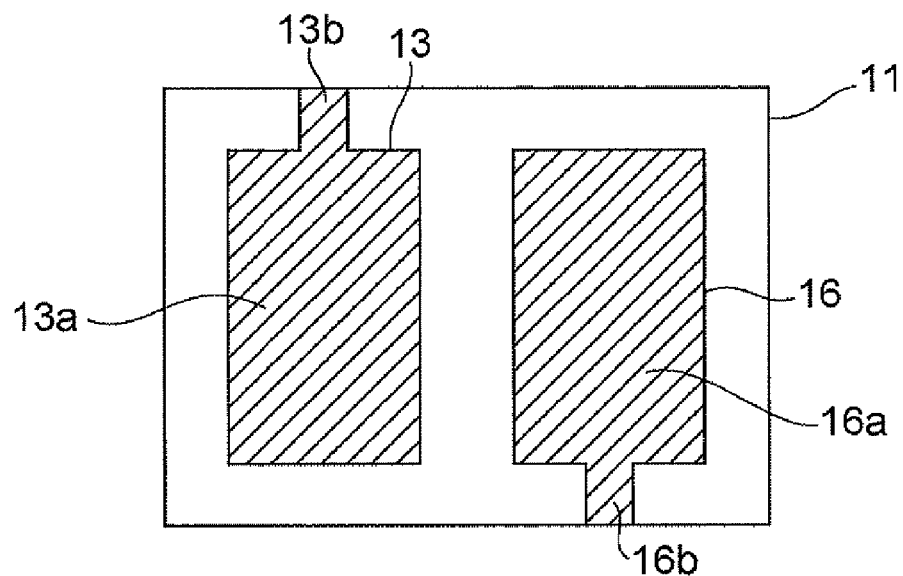
FIG. 6 is a diagram illustrating another example of inner electrodes in the multilayer capacitor array in accordance with the first embodiment.
Figure 6:
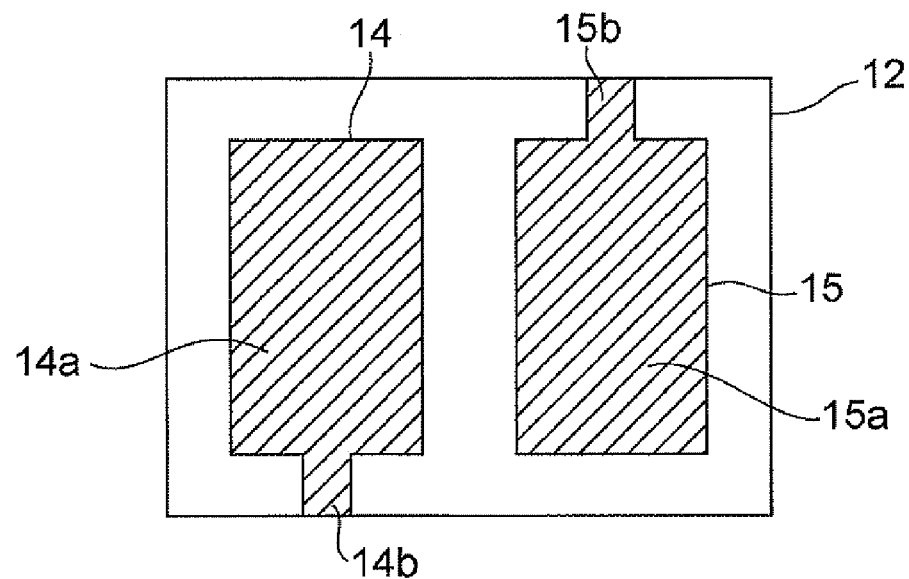

A modified example of the inner electrodes 13 to 16 used in the multilayer capacitor array 1 in accordance with the first embodiment includes those having structures illustrated in (a) and (b) of FIG. 6. In the modified example illustrated in FIG. 6, the first and fourth inner electrodes 13, 16 are formed on the insulator layer 11, while the second and third inner electrodes 14, 15 are formed on the insulator layer 12. The rest of the structure is the same as that mentioned above.

Second Embodiment

Figure 7:
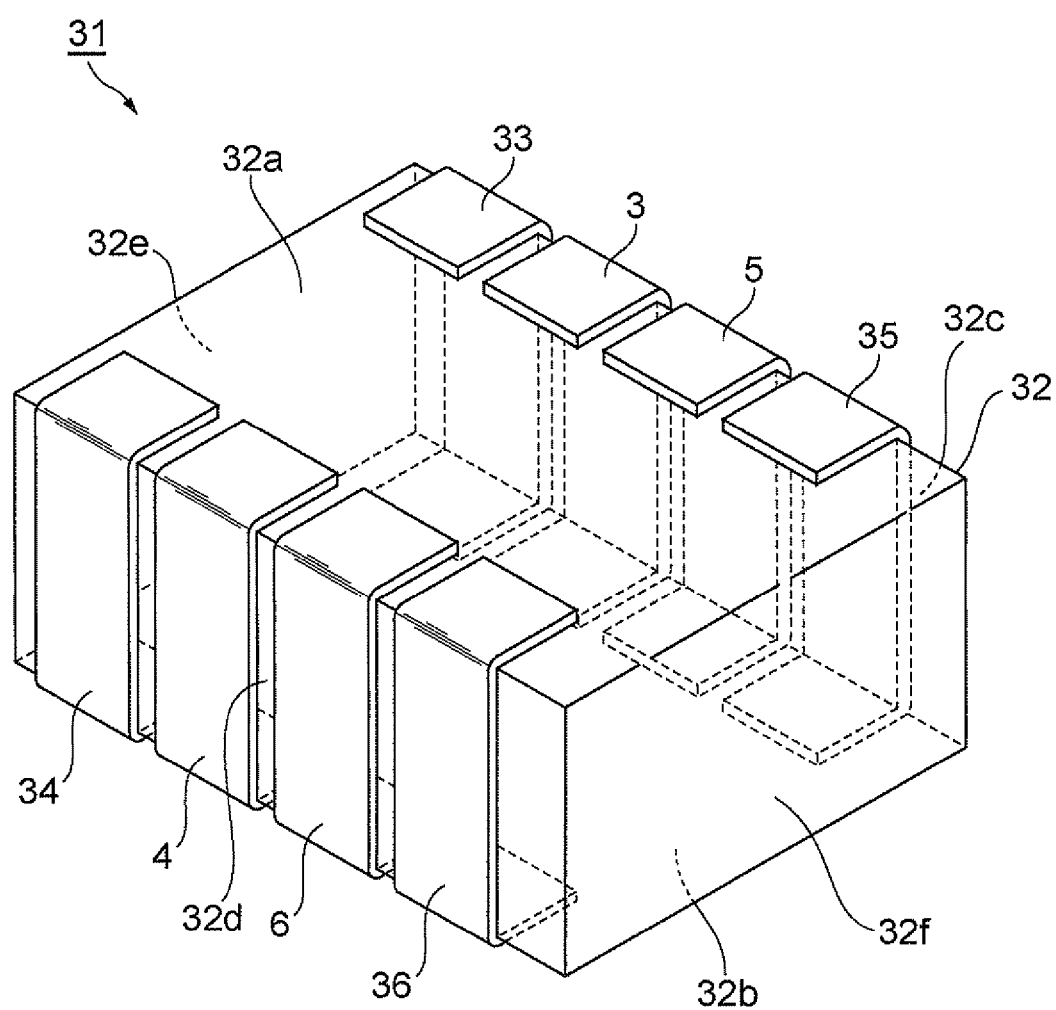
FIG. 7 is a perspective view of a multilayer capacitor array in accordance with a second embodiment.

The structure of a multilayer capacitor array 31 in accordance with the second embodiment will now be explained with reference to FIGS. 7 and 8. As illustrated in FIG. 7, the multilayer capacitor array 31 is a quadruple capacitor array comprising a capacitor element body 32 having a rectangular parallelepiped form and terminal electrodes 3, 4, 5, 6, 33, 34, 35, 36 disposed on the outer surface of the capacitor element body 32. As with the capacitor element body 2, the capacitor element body 32 includes first and second main faces 32a, 32b, first and second side faces 32c, 32d, and third and fourth side faces 32e, 32f.

In addition to the first and third terminal electrodes 3, 5, the fifth and seventh terminal electrodes 33, 35 are disposed on the first side face 32c of the capacitor element body 32. The first, third, fifth, and seventh terminal electrodes 3, 5, 33, 35 are located in the order of the fifth terminal electrode 33, first terminal electrode 3, third terminal electrode 5, and seventh terminal electrode 35 in the direction from the third side face 32e to the fourth side face 32f. In addition to the second and fourth terminal electrodes 4, 6, the sixth and eighth terminal electrodes 34, 36 are disposed on the second side face 32d of the capacitor element body 32. The second, fourth, sixth, and eighth terminal electrodes 4, 6, 34, 36 are located in the order of the sixth terminal electrode 34, second terminal electrode 4, fourth terminal electrode 6, and eighth terminal electrode 36 in the direction from the third side face 32e to the fourth side face 32f. The fifth and sixth terminal electrodes 33, 34 oppose each other in a direction in which the first and second side faces 32c, 32d oppose each other. The seventh and eighth terminal electrodes 35, 36 oppose each other in the direction in which the first and second side faces 32c, 32d oppose each other.

Figure 8:
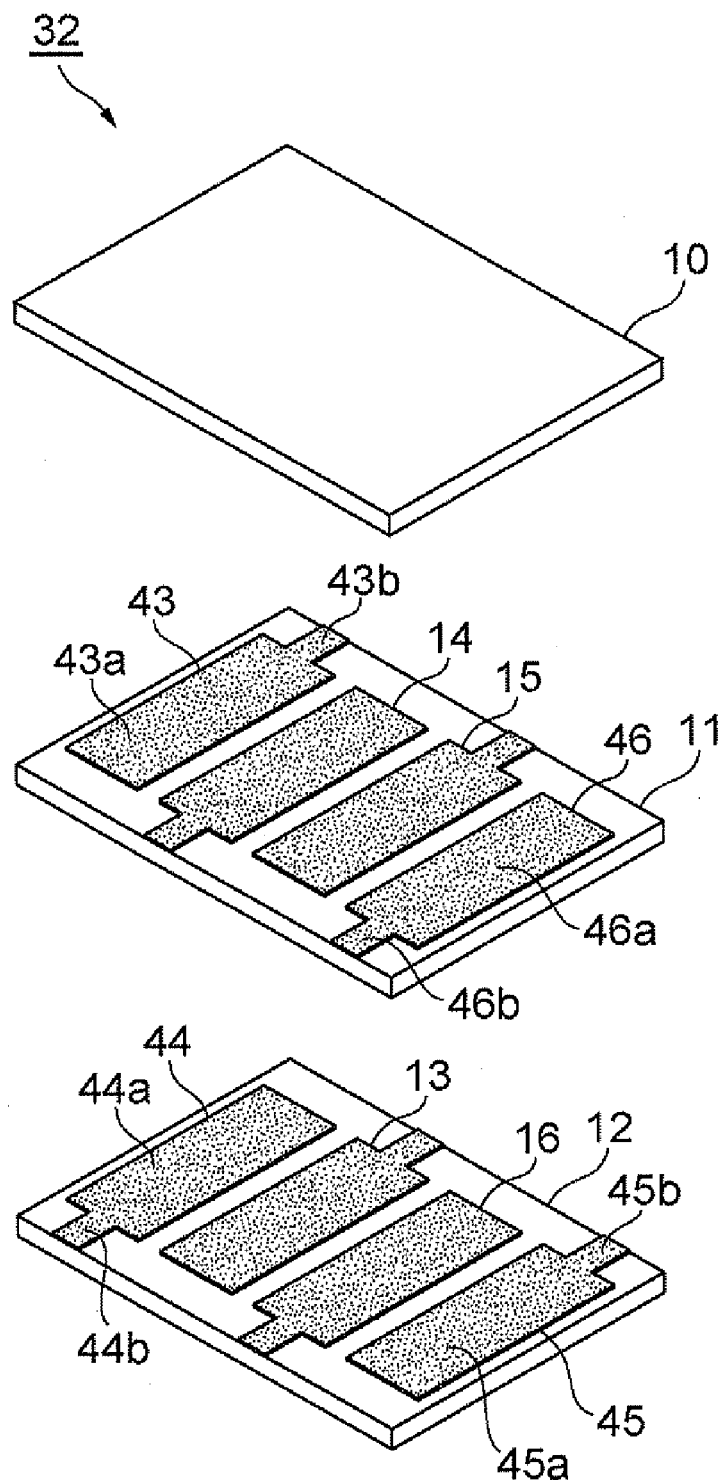
FIG. 8 is an exploded perspective view of a capacitor element body included in the multilayer capacitor array in accordance with the second embodiment.
Figure 9:
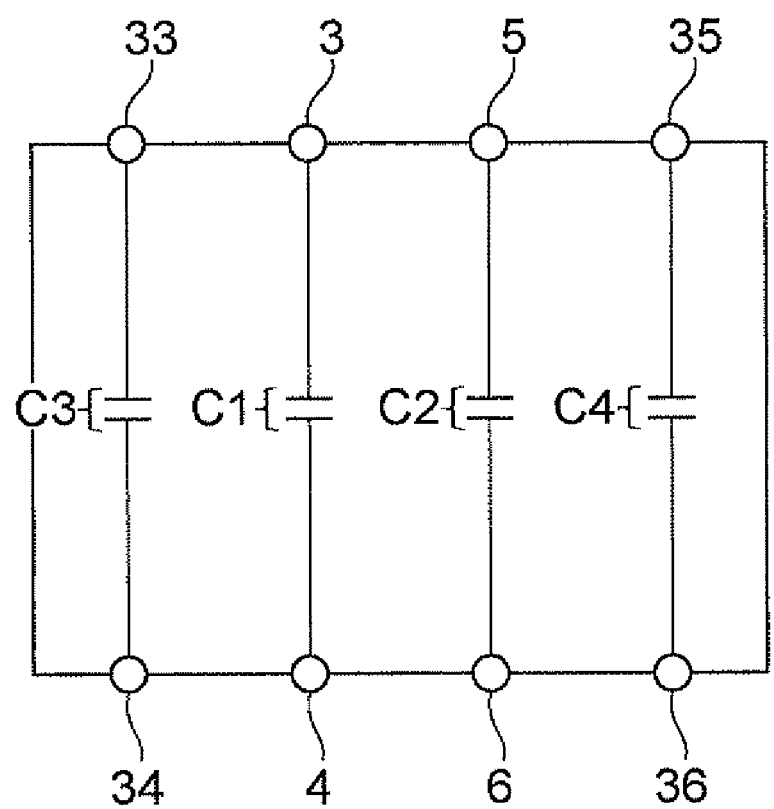
FIG. 9 is an equivalent circuit diagram of the multilayer capacitor array in accordance with the second embodiment.

As illustrated in FIG. 8, the capacitor element body 32 has insulator layers 10, 11, 12 and inner electrodes 13 to 16, 43 to 46. The fifth and sixth inner electrodes 43, 44 are arranged such as to oppose each other through the insulator layer 11 interposed therebetween, and form a third capacitor section C3 (see FIG. 9). The seventh and eighth inner electrodes 45, 46 are arranged such as to oppose each other through the insulator layer 11 interposed therebetween, and form a fourth capacitor section C4 (see FIG. 9). In this embodiment, the third and fourth capacitor sections C3, C4 have the same capacitance, which is different from and smaller than that of the first and second capacitor sections C1, C2. The capacitance of the third and fourth capacitor sections C3, C4 may be set identical to or greater than that of the first and second capacitor sections C1, C2 as a matter of course.

The second, third, fifth, and eighth inner electrodes 14, 15, 43, 46 are formed on the insulator layer 11. The second, third, fifth, and eighth inner electrodes 14, 15, 43, 46 are arranged in a row at predetermined intervals such as to be electrically insulated from each other in the direction in which the third and fourth side faces 32e, 32f oppose each other. The first, fourth, sixth, and seventh inner electrodes 13, 16, 44, 45 are formed on the insulator layer 12. The first, fourth, sixth, and seventh inner electrodes 13, 16, 44, 45 are arranged in a row at predetermined intervals such as to be electrically insulated from each other in the direction in which the third and fourth side faces 32e, 32f oppose each other.

The fifth inner electrode 43 includes a rectangular main electrode part 43a and a lead part 43b extending from the main electrode part 43a such as to reach the first side face 32c. The sixth inner electrode 44 includes a rectangular main electrode part 44a and a lead part 44b extending from the main electrode part 44a such as to reach the second side face 32d. The main electrode parts 43a, 44a oppose each other over substantially the whole surface through the insulator layer 11 in the laminating direction. The lead part 43b is drawn to the first side face 32c and connected to the fifth terminal electrode 33 electrically and physically, while the lead part 44b is drawn to the second side face 32d and connected to the sixth terminal electrode 34 electrically and physically.

The seventh inner electrode 45 includes a rectangular main electrode part 45a and a lead part 45b extending from the main electrode part 45a such as to reach the first side face 32c. The eighth inner electrode 46 includes a rectangular main electrode part 46a and a lead part 46b extending from the main electrode part 46a such as to reach the second side face 32d. The main electrode parts 45a, 46a oppose each other over substantially the whole surface through the insulator layer 11 in the laminating direction. The lead part 45b is drawn to the first side face 32c and connected to the seventh terminal electrode 35 electrically and physically, while the lead part 46b is drawn to the second side face 32d and connected to the eighth terminal electrode 36 electrically and physically. The multilayer capacitor array 31 having such a structure is represented by the equivalent circuit diagram illustrated in FIG. 9.

Figure 10:
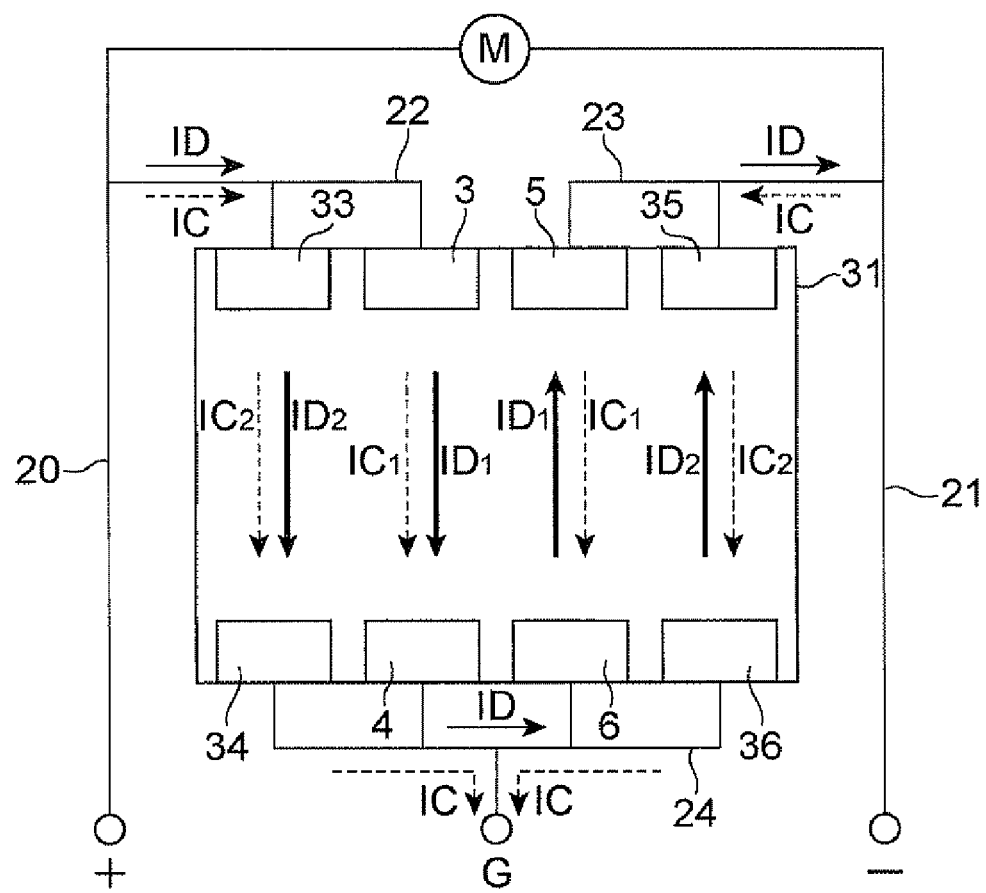
FIG. 10 is a diagram illustrating an example in which the multilayer capacitor array in accordance with the second embodiment is mounted to a circuit board.

A mounting structure in which the multilayer capacitor array 31 is mounted to a circuit board will now be explained. As illustrated in FIG. 10, the circuit board is formed with a pair of power lines 20, 21 for supplying a current to a device M, first leads 22, 23 connecting the power lines 20, 21 to each other, and a second lead 24 for grounding as in the first embodiment.

Figure 11:
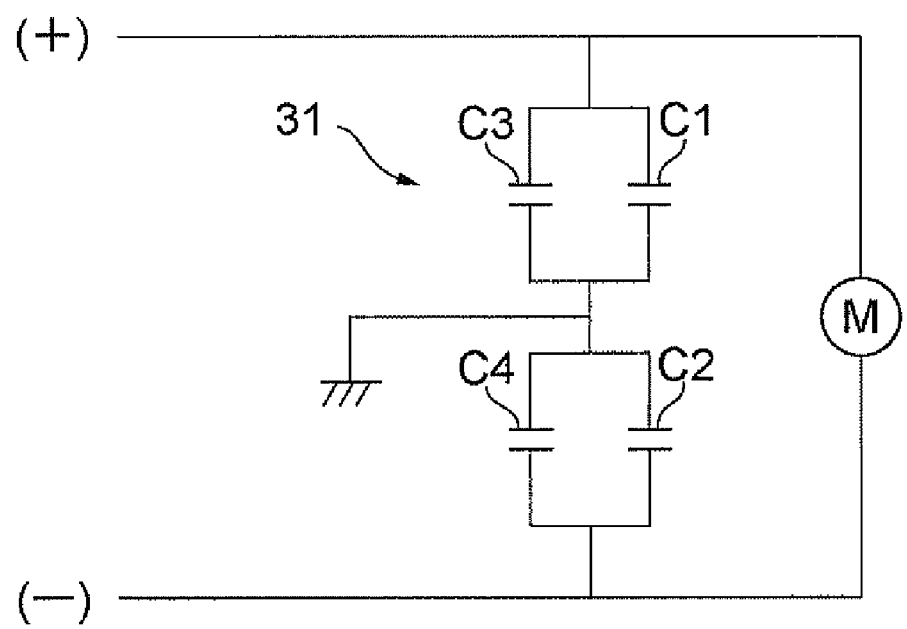
FIG. 11 is an equivalent circuit diagram in the case where the multilayer capacitor array is connected to the circuit board as illustrated in FIG. 10.

For mounting the multilayer capacitor array 31 onto this circuit board, the first and fifth terminal electrodes 3, 33 are connected to the first lead 22, the second and sixth terminal electrodes 4, 34 are connected to the second lead 24, the third and seventh terminal electrodes 5, 35 are connected to the first lead 23, and the fourth and eighth terminal electrodes 6, 36 are connected to the second lead 24. That is, in this mounting structure, the first, third, fifth, and seventh terminal electrodes 3, 5, 33, 35 disposed on the same side face 32c are connected to the first leads 22, 23 connecting the power lines 20, 21 to each other, while the second, fourth, sixth, and eighth terminal electrodes 4, 6, 34, 36 disposed on the same side face 32d are connected to the second lead 24 for grounding. These connect the multilayer capacitor array 31 to the leads 22 to 24 such that the first and third capacitor sections C1, C3 are in parallel with each other while the second and fourth capacitor sections C2, C4 are in parallel with each other as illustrated in the equivalent circuit diagram of FIG. 11, and further mount the multilayer capacitor 31 in parallel with the device M.

In the differential mode in the multilayer capacitor array 31 mounted as explained in the foregoing, as illustrated in FIG. 10, a current $ID_1$ flows through the first capacitor section C1 from the first terminal electrode 3 to the second terminal electrode 4, while a current $ID_2$ flows through the third capacitor section C3 from the fifth terminal electrode 33 to the sixth terminal electrode 34. Also, the current $ID_1$ flows through the second capacitor section C2 from the fourth terminal electrode 6 to the third terminal electrode 5, while the current $ID_2$ flows through the fourth capacitor section C4 from the eighth terminal electrode 36 to the seventh terminal electrode 35.

In the common mode, on the other hand, a current $IC_1$ flows through the first capacitor section C1 from the first terminal electrode 3 to the second terminal electrode 4, while a current $IC_2$ flows through the third capacitor section C3 from the fifth terminal electrode 33 to the sixth terminal electrode 34. Also, the current $IC_1$ flows through the second capacitor section C2 from the third terminal electrode 5 to the fourth terminal electrode 6, while the current $IC_2$ flows through the fourth capacitor section C4 from the seventh terminal electrode 35 to the eighth terminal electrode 36. Here, the currents $ID_1$ and $ID_2$ are those obtained by dividing a current ID in a predetermined ratio, while the currents $IC_1$ and $IC_2$ are those obtained by dividing a current IC in a predetermined ratio.

As in the foregoing, the first and second capacitor sections C1, C2 function both as a capacitor for eliminating differential-mode noise and a capacitor for eliminating common-mode noise in the mounting structure for the multilayer capacitor array 31 in accordance with this embodiment as explained in the first embodiment. Similarly, the third and fourth capacitor sections C3, C4 function both as a capacitor for eliminating the differential-mode noise and a capacitor for eliminating the common-mode noise. Therefore, the mounting structure for the multilayer capacitor array 31 can easily eliminate two kinds of noise composed of differential-mode noise and common-mode noise by using a single element.

The capacitor element body 32 further has the fifth and sixth inner electrodes 43, 44 and the seventh and eighth inner electrodes 45, 46, while the multilayer capacitor array 31 is equipped with the fifth and sixth terminal electrodes 33, 34 and the seventh and eighth terminal electrodes 35, 36. The fifth and sixth inner electrodes 43, 44 form the third capacitor section C3 having a capacitance different from that of the first and second capacitor sections C1, C2, while the seventh and eighth inner electrodes 45, 46 form the fourth capacitor section C4 having the same capacitance as that of the third capacitor section C3 (i.e., the capacitance different from that of the first and second capacitor sections C1, C2). Further, the fifth and seventh terminal electrodes 33, 35 are connected to the first leads 22, 23, while the sixth and eighth terminal electrodes 34, 36 are connected to the second lead 24.

Figure 12:
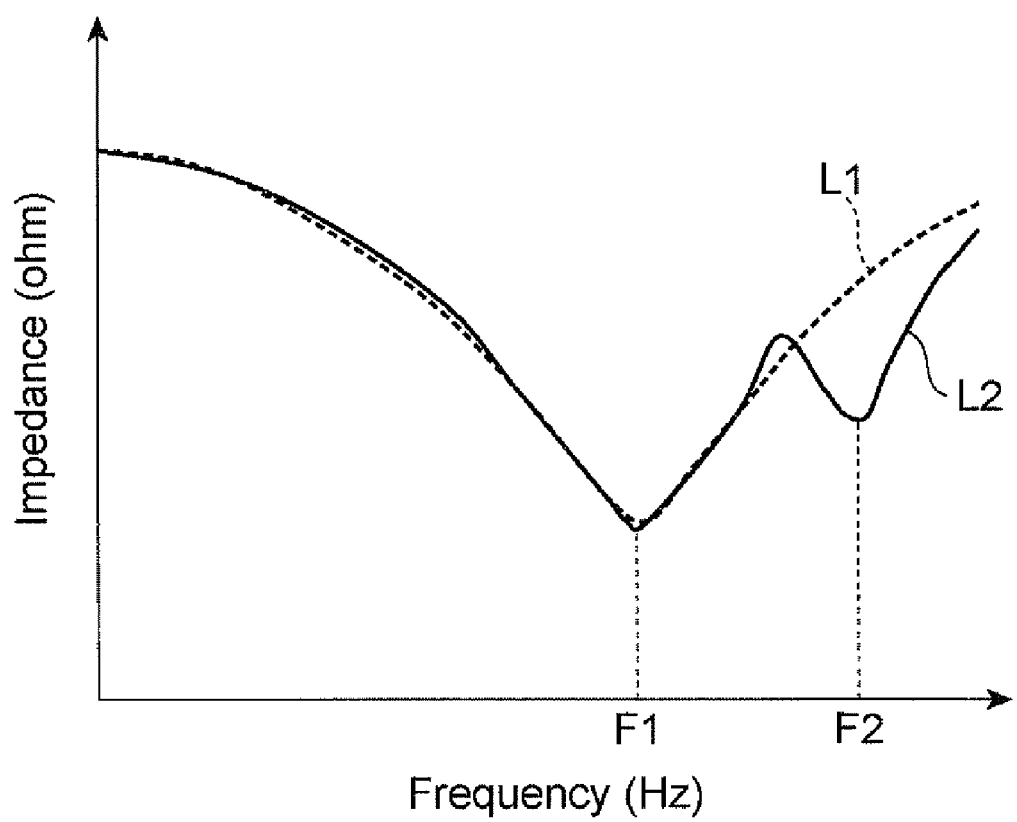
FIG. 12 is a chart illustrating an example of noise elimination in a wide band by the multilayer capacitor array illustrated in FIG. 11.

These connect the first and third capacitor sections C1, C3 having respective capacitances different from each other in parallel with each other or the second and fourth capacitor sections C2, C4 having respective capacitances different from each other in parallel with each other. Therefore, while a capacitor array in which capacitor sections having different capacities are not connected in parallel can have only one self-resonant frequency F1 as illustrated by dotted curve L1 in FIG. 12, the mounting structure in accordance with this embodiment can have two self-resonant frequencies such as frequencies F1, F2 as illustrated by solid curve L2 in FIG. 12. This lowers impedance in a wide band, whereby such a mounting structure for the capacitor array 31 can eliminate high-frequency noise in the wide band.

In the multilayer capacitor array 31, the capacitance of the capacitor sections C1, C3 and the capacitance of the capacitor sections C2, C4 are symmetrical to each other. Therefore, as in the first embodiment, the multilayer capacitor array 31 can be mounted and so forth without taking account of the mounting direction.

Figure 13:
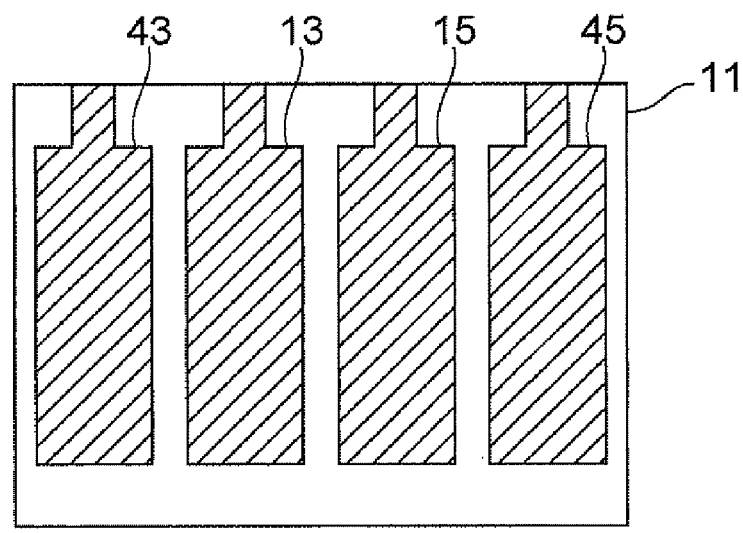
FIG. 13 is a diagram illustrating another example of inner electrodes in the multilayer capacitor array in accordance with the second embodiment.
Figure 13:
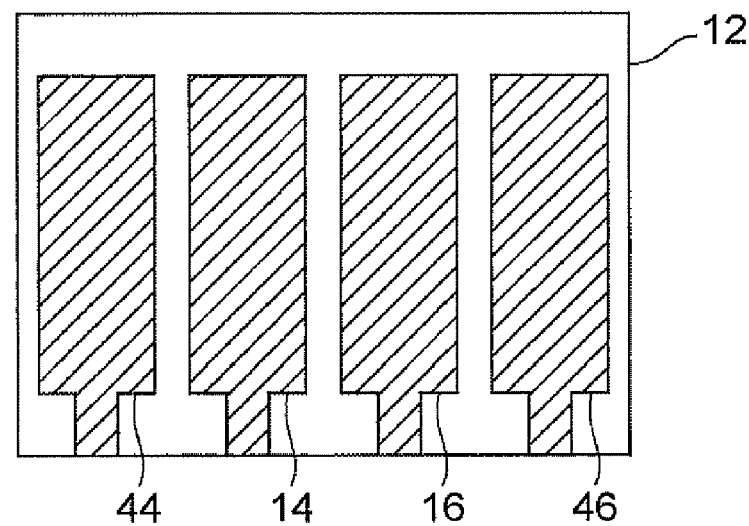

A modified example of the inner electrodes 13 to 16, 43 to 46 used in the multilayer capacitor array 31 in accordance with the second embodiment includes those having structures illustrated in (a) and (b) of FIG. 13. In the modified example illustrated in FIG. 13, the first, third, fifth, and seventh inner electrodes 13, 15, 43, 45 are formed on the insulator layer 11, while the second, fourth, sixth, and eighth inner electrodes 14, 16, 44, 46 are formed on the insulator layer 12. The rest of the structure is the same as that mentioned above, which will also hold in the following modified examples.

Figure 14:
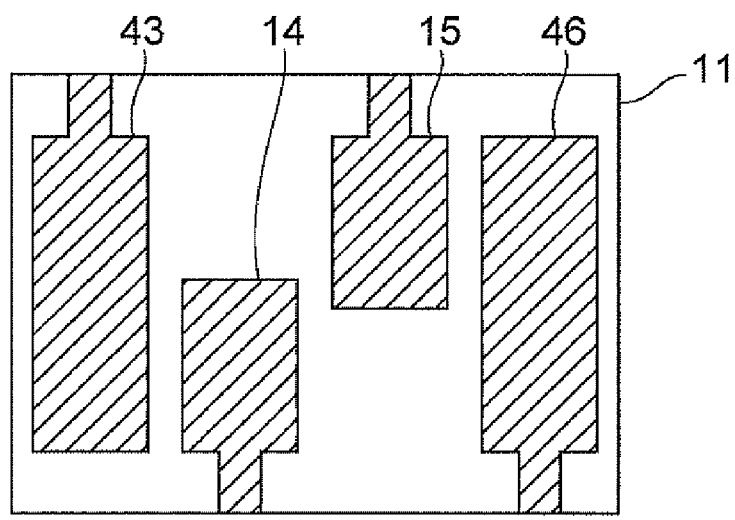
FIG. 14 is a diagram illustrating still another example of inner electrodes in the multilayer capacitor array in accordance with the second embodiment.
Figure 14:
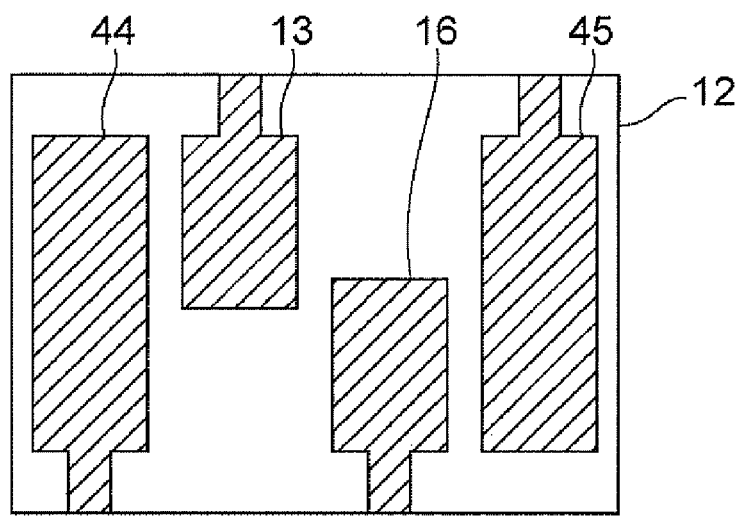

Another modified example of the inner electrodes 13 to 16, 43 to 46 includes those having structures illustrated in (a) and (b) of FIG. 14. The modified example illustrated in FIG. 14 is constructed such that the second, third, fifth, and eighth inner electrodes 14, 15, 43, 46 are formed on the insulator layer 11, while the first, fourth, sixth, and seventh inner electrodes 13, 16, 44, 45 are formed on the insulator layer 12. In this modified example, the inner electrodes 13 to 16 have an area smaller than that of the inner electrodes 43 to 46, the main electrode parts 13a, 14a of the first and second inner electrodes 13, 14 forming the first capacitor section C1 partly oppose each other through the insulator layer 11 in the laminating direction, and the main electrode parts 15a, 16a of the third and fourth inner electrodes 15, 16 forming the second capacitor section C2 partly oppose each other through the insulator layer 11 in the laminating direction. Therefore, the capacitance of the first and second capacitor sections C1, C2 is smaller than that of the third and fourth capacitor sections C3, C4.

Figure 15:
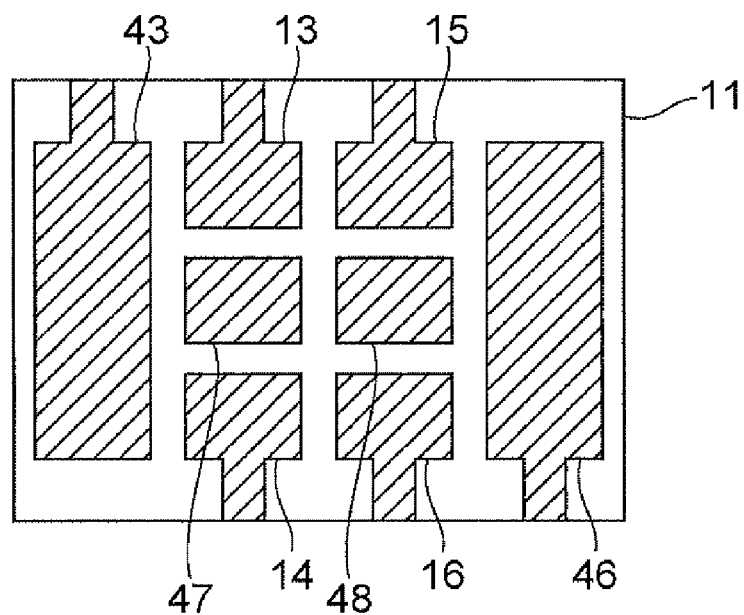
FIG. 15 is a diagram illustrating still another example of inner electrodes in the multilayer capacitor array in accordance with the second embodiment.
Figure 15:
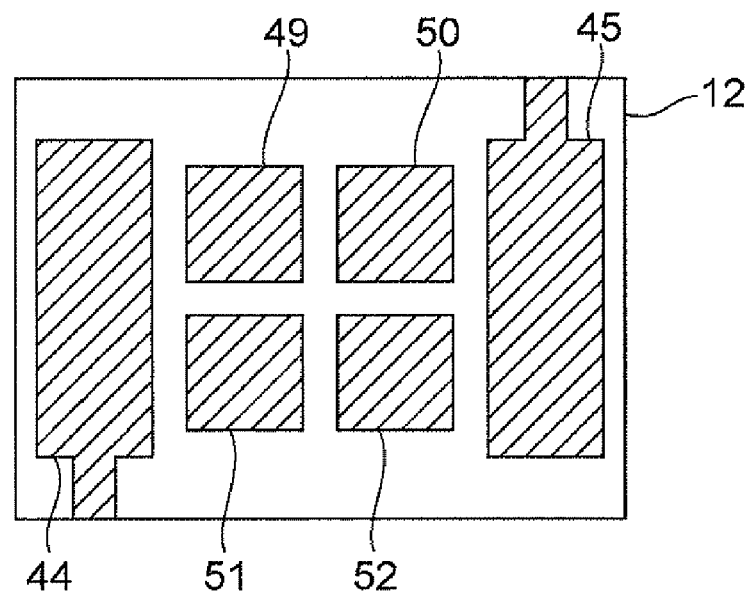

Still another modified example of the inner electrodes 13 to 16, 43 to 46 includes inner electrodes 13 to 16, 43 to 46, 47 to 52 having structures illustrated in (a) and (b) of FIG. 15. The modified example illustrated in FIG. 15 is constructed such that the first to fourth, fifth, and eighth inner electrodes 13 to 16, 43, 46 and inner electrodes 47, 48 are formed on the insulator layer 11, while the sixth and seventh inner electrodes 44, 45 and inner electrodes 49 to 52 are formed on the insulator layer 12. In this modified example, the first capacitor section C1 is constituted by a plurality of capacitor parts formed by the inner electrodes 13, 49, 47, 51, 14, while the second capacitor section C2 is constituted by a plurality of capacitor parts formed by the inner electrodes 15, 50, 48, 52, 16. Thus making the first and second capacitor sections C1, C2 as assemblies of capacitor parts having a smaller capacitance can shift the resonant frequency to the higher frequency side.

Figure 16:
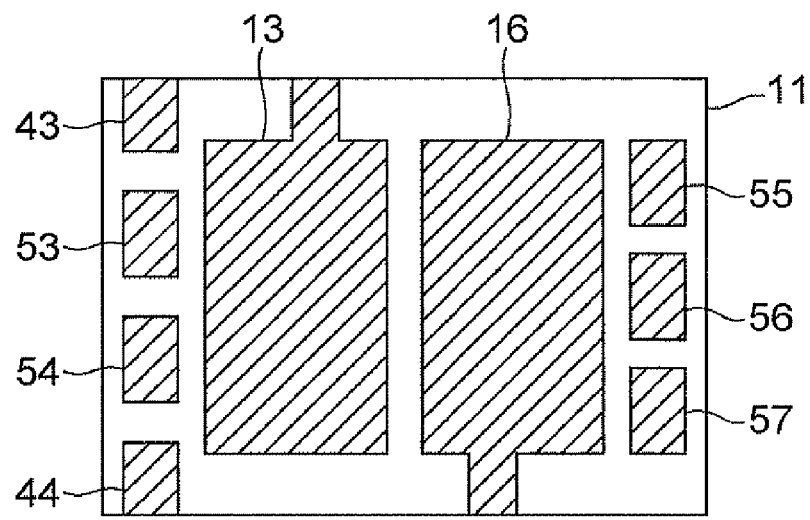
FIG. 16 is a diagram illustrating still another example of inner electrodes in the multilayer capacitor array in accordance with the second embodiment.
Figure 16:
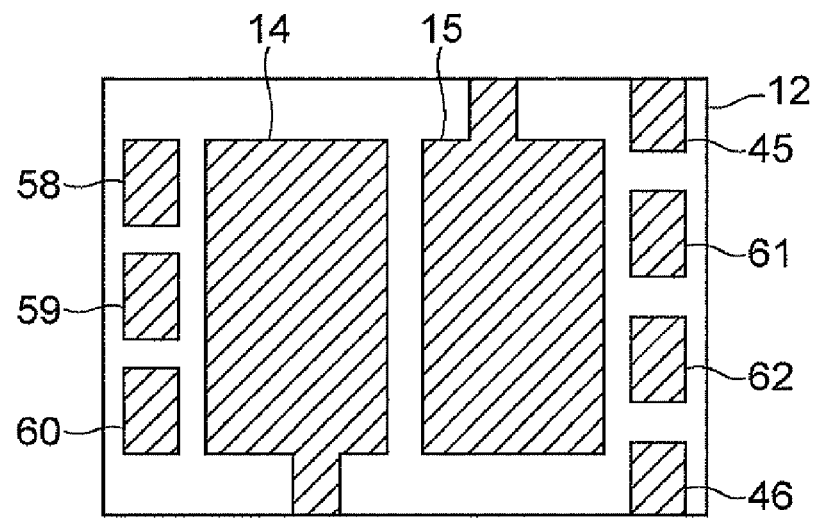

Still another modified example of the inner electrodes 13 to 16, 43 to 46 includes inner electrodes 13 to 16, 43 to 46, 53 to 62 having structures illustrated in (a) and (b) of FIG. 16. The modified example illustrated in FIG. 16 is constructed such that the first, fourth, fifth, and sixth inner electrodes 13, 16, 43, 44 and inner electrodes 53 to 57 are faulted on the insulator layer 11, while the second, third, seventh, and eighth inner electrodes 14, 15, 45, 46 and inner electrodes 58 to 62 are formed on the insulator layer 12. In this modified example, the third capacitor section C3 is constituted by a plurality of capacitor parts formed by the inner electrodes 43, 58, 53, 59, 54, 60, 44, while the fourth capacitor section C4 is constituted by a plurality of capacitor parts formed by the inner electrodes 45, 55, 61, 56, 62, 57, 46. Thus making assemblies of capacitor parts having a smaller capacitance can shift the resonant frequency to the higher frequency side.

Third Embodiment

Figure 17:
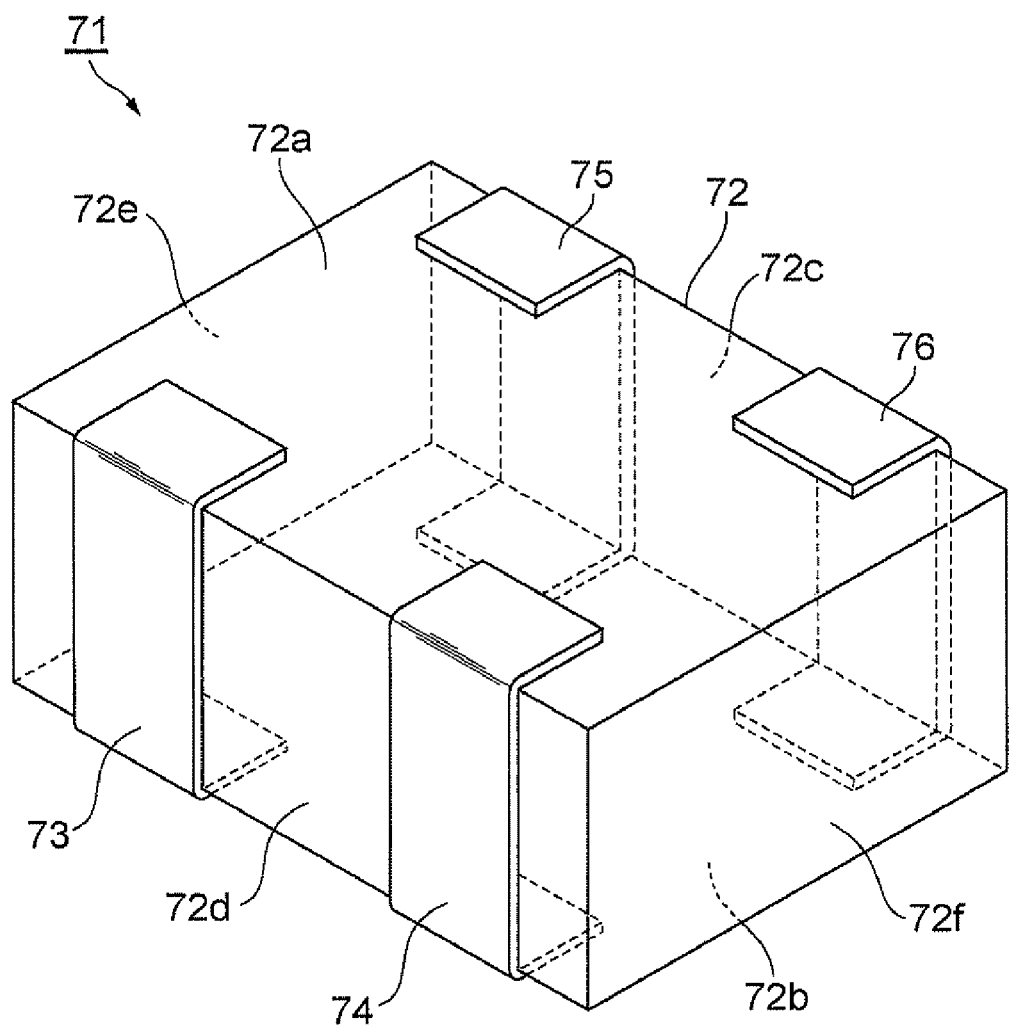
FIG. 17 is a perspective view of a multilayer capacitor array in accordance with a third embodiment.

The structure of a multilayer capacitor array 71 in accordance with the third embodiment will now be explained with reference to FIGS. 17 and 18. As illustrated in FIG. 17, the multilayer capacitor array 71 is a double capacitor array comprising a capacitor element body 72 having a rectangular parallelepiped form and terminal electrodes 73, 74, 75, 76 disposed on the outer surface of the capacitor element body 72. As with the capacitor element body 2, the capacitor element body 72 includes first and second main faces 72a, 72b; first and second side faces 72c, 72d; and third and fourth side faces 72e, 72f.

The first and second terminal electrodes 73, 74 are disposed on the second side face 72d of the capacitor element body 72. The first and second terminal electrodes 73, 74 are located in this order in the direction from the third side face 72*e* to the fourth side face 72*f*. The third and fourth terminal electrodes 75, 76 are formed on the first side face 72*c* of the capacitor element body 72. The third and fourth terminal electrodes 75, 76 are located in this order in the direction from the third side face 72*e* to the fourth side face 72*f*. The first and third terminal electrodes 73, 75 oppose each other in the direction in which the first and second side faces 72*c*, 72*d* oppose each other. The second and fourth terminal electrodes 74, 76 oppose each other in the direction in which the first and second side faces 72*c*, 72*d* oppose each other.

Figure 18:
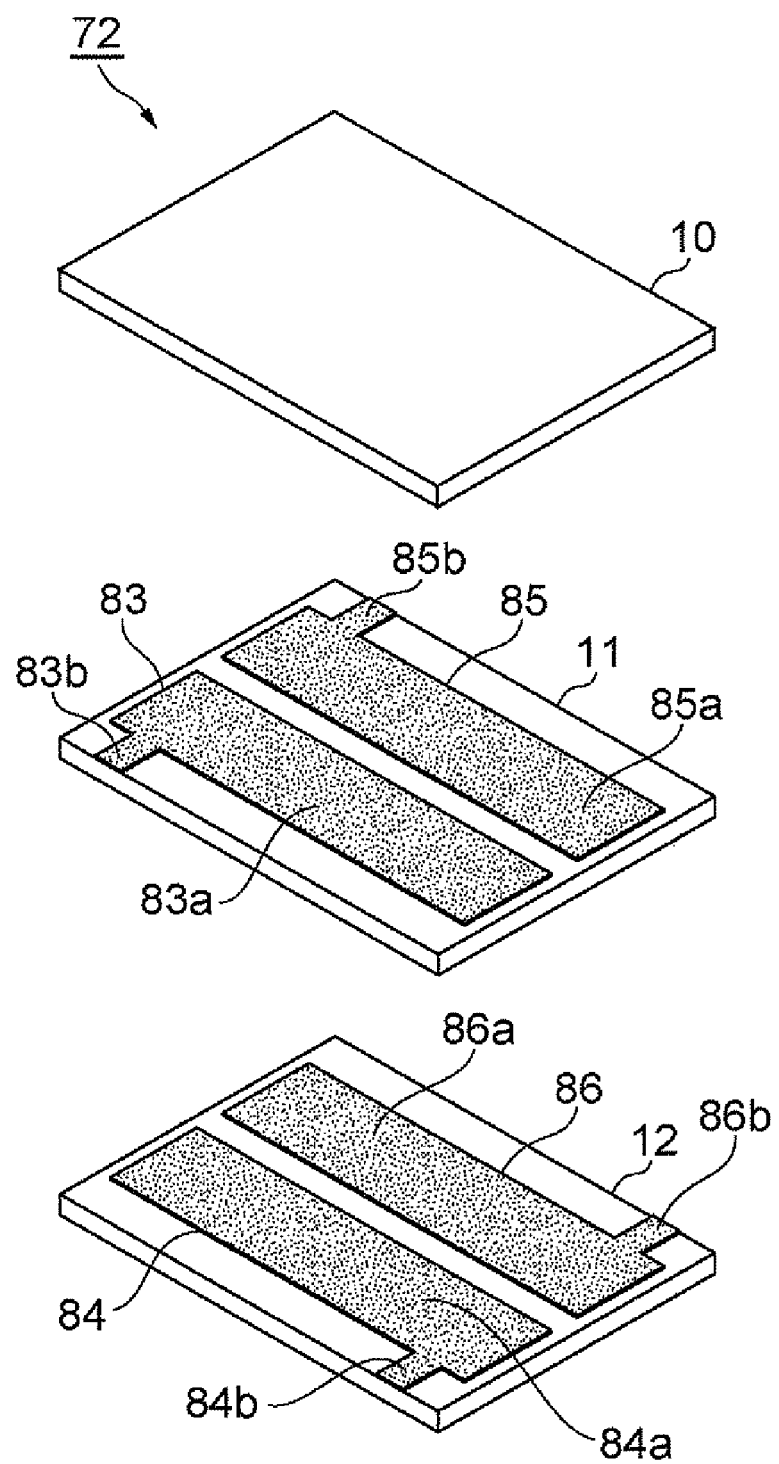
FIG. 18 is an exploded perspective view of a capacitor element body included in the multilayer capacitor array in accordance with the third embodiment.
Figure 19:
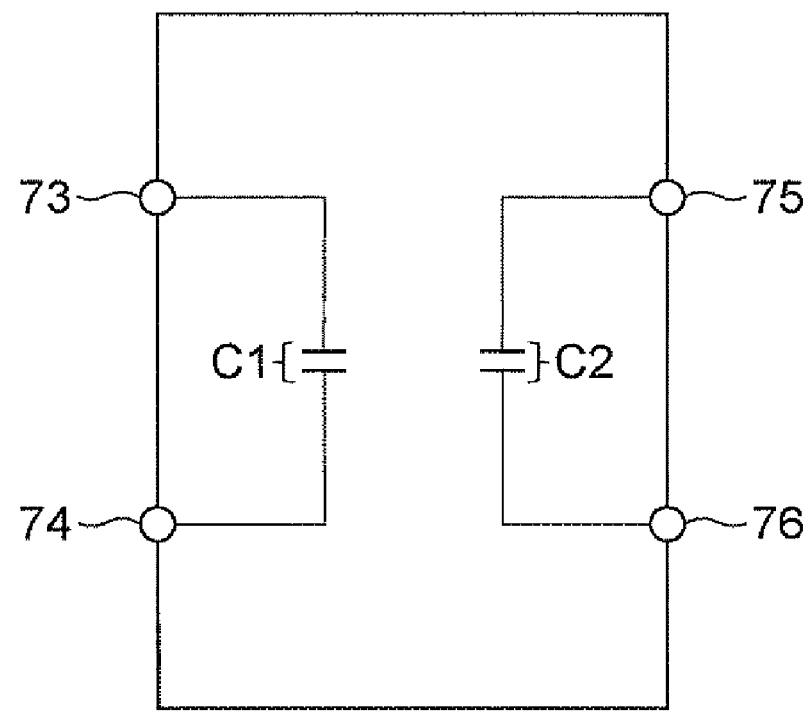
FIG. 19 is an equivalent circuit diagram of the multilayer capacitor array in accordance with the third embodiment.

As illustrated in FIG. 18, the capacitor element body 72 has insulator layers 10, 11, 12 and inner electrodes 83, 84, 85, 86. The first and second inner electrodes 83, 84 are arranged such as to oppose each other through the insulator layer 11 interposed therebetween, and form a first capacitor section C1 (see FIG. 19). The third and fourth inner electrodes 85, 86 are arranged such as to oppose each other through the insulator layer 11 interposed therebetween, and form a second capacitor section C2 (see FIG. 19).

The first and third inner electrodes 83, 85 are formed on the insulator layer 11. The first and third inner electrodes 83, 85 are arranged in a row while having a predetermined gap therebetween such as to be electrically insulated from each other in the direction in which the first and second side faces 72*c*, 72*d* oppose each other. The second and fourth inner electrodes 84, 86 are formed on the insulator layer 12. The second and fourth inner electrodes 84, 86 are arranged in a row while having a predetermined gap therebetween such as to be electrically insulated from each other in the direction in which the first and second side faces 72*c*, 72*d* oppose each other.

The first inner electrode 83 includes a rectangular main electrode part 83*a* and a lead part 83*b* extending from the main electrode part 83*a* such as to reach the second side face 72*d*. The second inner electrode 84 includes a rectangular main electrode part 84*a* and a lead part 84*b* extending from the main electrode part 84*a* such as to reach the second side face 72*d*. The main electrode parts 83*a*, 84*a* oppose each other over substantially the whole surface through the insulator layer 11 in the laminating direction. The lead part 83*b* is drawn to the second side face 72*d* and connected to the first terminal electrode 73 electrically and physically. The lead part 84*b* is drawn to the second side face 72*d* and connected to the second terminal electrode 74 electrically and physically.

The third inner electrode 85 includes a rectangular main electrode part 85*a* and a lead part 85*b* extending from the main electrode part 85*a* such as to reach the first side face 72*c*. The fourth inner electrode 86 includes a rectangular main electrode part 86*a* and a lead part 86*b* extending from the main electrode part 86*a* such as to reach the first side face 72*c*. The main electrode parts 85*a*, 86*a* oppose each other over substantially the whole surface through the insulator layer 11 in the laminating direction. The lead part 85*b* is drawn to the first side face 72*c* and connected to the third terminal electrode 75 electrically and physically. The lead part 86*b* is drawn to the first side face 72*c* and connected to the fourth terminal electrode 76 electrically and physically. The multilayer capacitor array 71 having such a structure is represented by the equivalent circuit diagram illustrated in FIG. 19.

Figure 20:
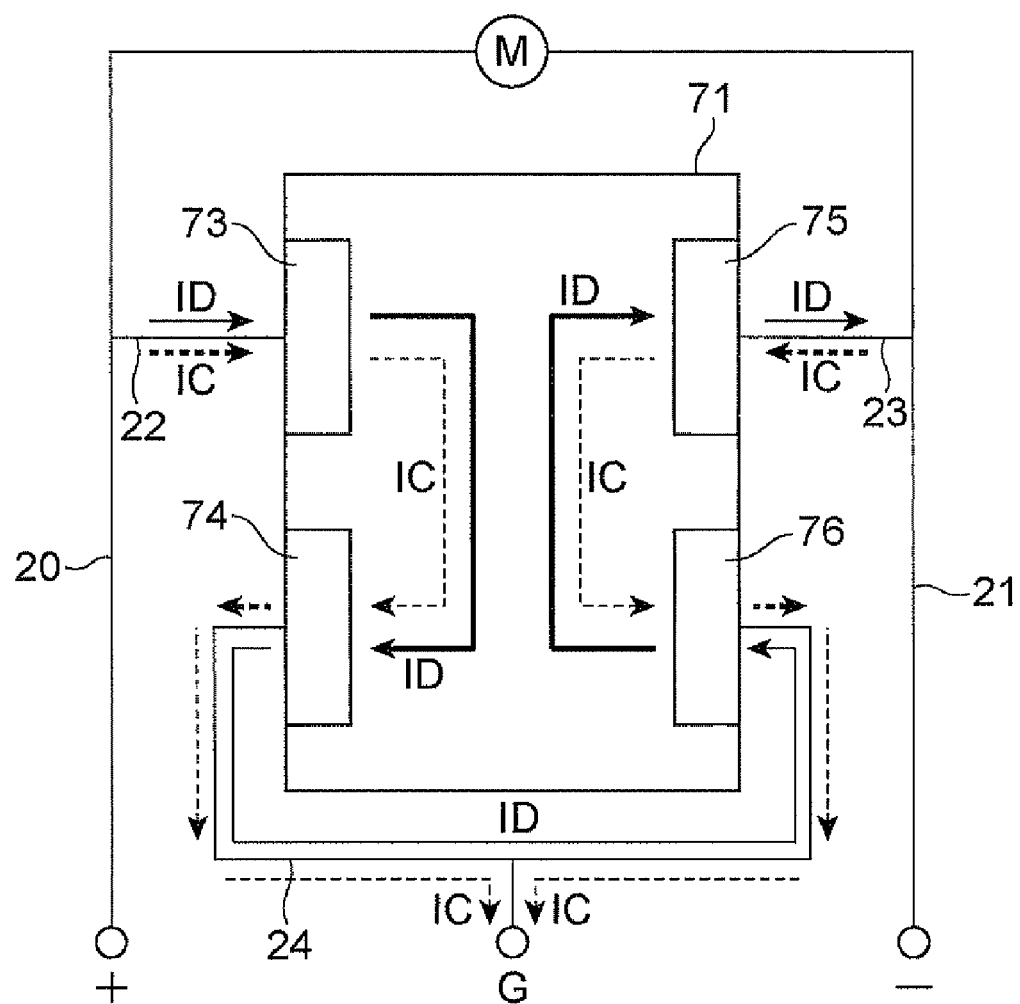
FIG. 20 is a diagram illustrating an example in which the multilayer capacitor array in accordance with the third embodiment is mounted to a circuit board.

A mounting structure in which the multilayer capacitor array 71 is mounted to a circuit board will now be explained. As illustrated in FIG. 20, the circuit board is formed with a pair of power lines 20, 21 for supplying a current to a device M, first leads 22, 23 connecting the power lines 20, 21 to each other, and a second lead 24 for grounding.

Figure 21:
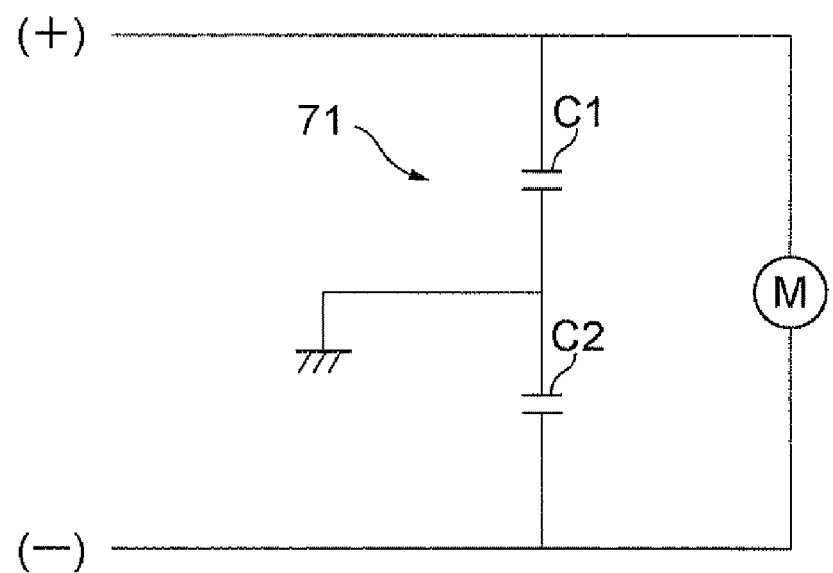
FIG. 21 is an equivalent circuit diagram in the case where the multilayer capacitor array is connected to the circuit board as illustrated in FIG. 20.

In this embodiment, when mounting the multilayer capacitor array 71 onto the circuit board, the first terminal electrode 73 is connected to the first lead 22, the second terminal electrode 74 is connected to the second lead 24, the third terminal electrode 75 is connected to the first lead 23, and the fourth terminal electrode 76 is connected to the second lead 24. That is, in this mounting structure, the first and second terminal electrodes 73, 74 disposed on the same side face 72*d* are connected to the first and second leads 22, 24, respectively, while the third and fourth terminal electrodes 75, 76 disposed on the side face 72*c* are connected to the first and second leads 23, 24, respectively. These connections mount the multilayer capacitor array 71 in parallel with the device M as illustrated in the equivalent circuit diagram of FIG. 21.

In the differential mode in the multilayer capacitor array 71 mounted as mentioned above, as illustrated in FIG. 20, a current ID flows through the first capacitor section C1 from the first terminal electrode 73 to the second terminal electrode 74 and through the second capacitor section C2 from the fourth terminal electrode 76 to the third terminal electrode 75. In the common mode, on the other hand, a current IC flows through the first capacitor section C1 from the first terminal electrode 73 to the second terminal electrode 74 and through the second capacitor section C2 from the third terminal electrode 75 to the fourth terminal electrode 76.

As in the foregoing, the mounting structure for the multilayer capacitor array 71 in accordance with this embodiment is constructed such that the first terminal electrode 73 connected to the first inner electrode 83 forming a part of the first capacitor section C1 and the third terminal electrode 75 connected to the third inner electrode 85 forming a part of the second capacitor section C2 are connected to the first leads 22, 23, while the second terminal electrode 74 connected to the second inner electrode 84 forming a part of the first capacitor section C1 and the fourth terminal electrode 76 connected to the fourth inner electrode 86 forming a part of the second capacitor section C2 are connected to the second lead 24.

Therefore, in the differential mode, the current ID flows through the first capacitor section C1 from the first terminal electrode 73 to the second terminal electrode 74 and through the second capacitor section C2 from the fourth terminal electrode 76 to the third terminal electrode 75. In the common mode, on the other hand, the current IC flows through the first capacitor section C1 from the first terminal electrode 73 to the second terminal electrode 74 and through the second capacitor section C2 from the third terminal electrode 75 to the fourth terminal electrode 76. This allows the first and second capacitor sections C1, C2 to function both as a capacitor for eliminating differential-mode noise and a capacitor for eliminating common-mode noise. Therefore, the mounting structure for the multilayer capacitor array 71 can easily eliminate two kinds of noise composed of differential-mode noise and common-mode noise by using a single element.

In the multilayer capacitor array 71, the first and second terminal electrodes 73, 74 are disposed on the side face 72*d* of the capacitor element body 72, while the third and fourth terminal electrodes 75, 76 are disposed on the side face 72*c* of the capacitor element body 72. Therefore, not only the current ID has respective directions opposite to each other when flowing through the first and second capacitor sections C1, C2 in the differential mode, but also the current flowing through the leads 22, 23 and that flowing through the lead 24 are directed opposite to each other in the common mode, whereby the resulting magnetic fields cancel each other out, which can further reduce the ESL.

Figure 22:
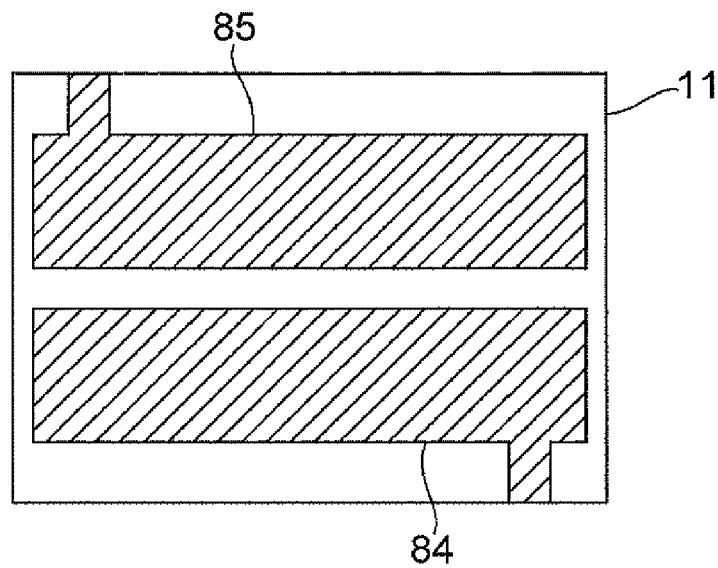
FIG. 22 is a diagram illustrating another example of inner electrodes in the multilayer capacitor array in accordance with the third embodiment.
Figure 22:
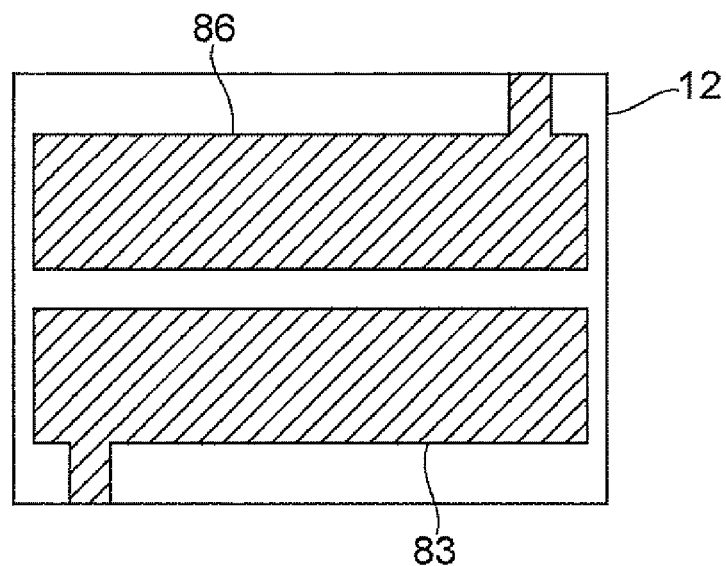

A modified example of the inner electrodes 83 to 86 used in the multilayer capacitor array 71 in accordance with the third embodiment includes those having structures illustrated in (a) and (b) of FIG. 22. The modified example illustrated in FIG. 22 is constructed such that the second and third inner electrodes 84, 85 are formed on the insulator layer 11, while the first and fourth inner electrodes 83, 86 are formed on the insulator layer 12. The rest of the structure is the same as that mentioned above, which will also hold in the following modified example.

Figure 23:
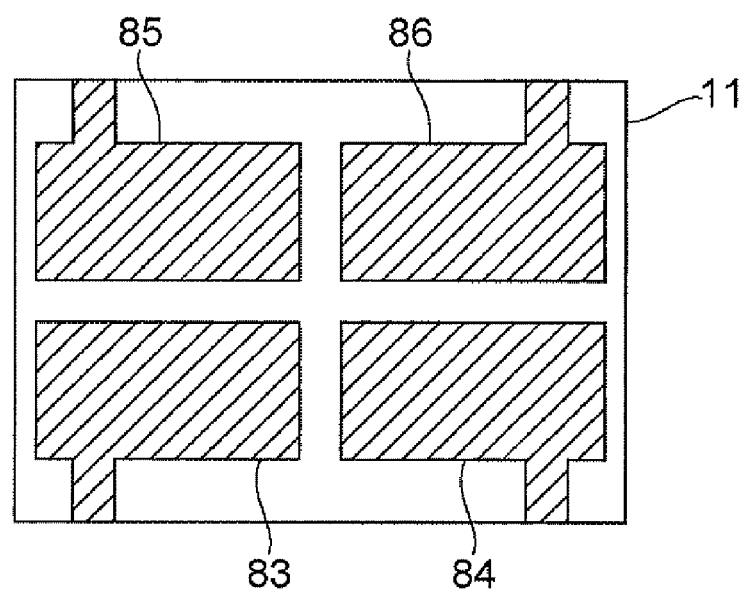
FIG. 23 is a diagram illustrating still another example of inner electrodes in the multilayer capacitor array in accordance with the third embodiment.
Figure 23:
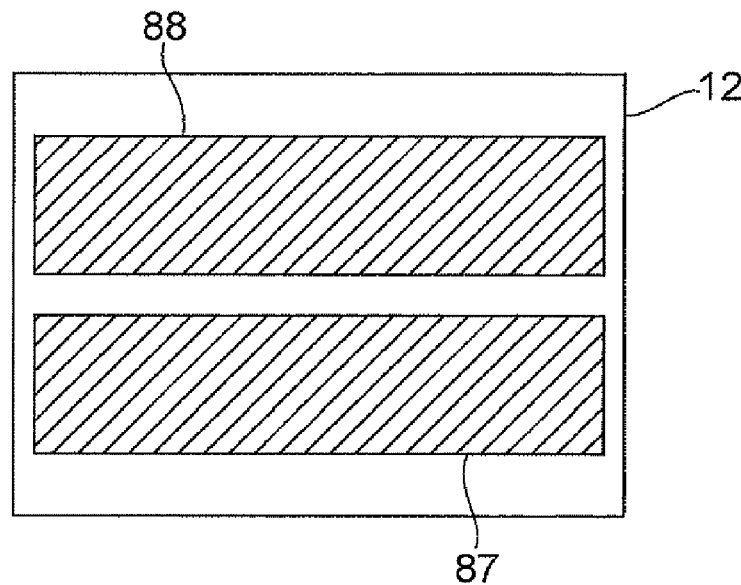

Another modified example of the inner electrodes 83 to 86 includes inner electrodes 83 to 86, 87, 88 having structures illustrated in (a) and (b) of FIG. 23. The modified example illustrated in FIG. 23 is constructed such that the first to fourth inner electrodes 83 to 86 are formed on the insulator layer 11, while the inner electrodes 87, 88 are formed on the insulator layer 12. In this modified example, the first capacitor section C1 is constituted by a plurality of capacitor parts formed by the inner electrodes 83, 87, 84, while the second capacitor section C2 is constituted by a plurality of capacitor parts formed by the inner electrodes 85, 88, 86. Such dividing can enhance voltage resistance, thereby achieving a safer design.

While preferred embodiments of the present invention have been explained in detail in the foregoing, the present invention can be modified in various ways without being restricted to the above-mentioned embodiments. For example, though the above-mentioned embodiments illustrate a number of examples of inner electrodes, the inner electrodes may be disposed differently without being limited thereto.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor array mounting structure for mounting a multilayer capacitor array onto a circuit board formed with a first lead connecting power lines to each other and a second lead for grounding;
the multilayer capacitor array comprising:
a capacitor element body having first, second, third, and fourth inner electrodes;
a first terminal electrode disposed on an outer surface of the capacitor element body and connected to the first inner electrode;
a second terminal electrode disposed on the outer surface of the capacitor element body and connected to the second inner electrode;
a third terminal electrode disposed on the outer surface of the capacitor element body and connected to the third inner electrode; and
a fourth terminal electrode disposed on the outer surface of the capacitor element body and connected to the fourth inner electrode;
wherein, in the multilayer capacitor array, the first and second inner electrodes form a first capacitor section, while the third and fourth inner electrodes form a second capacitor section;
wherein the first and third terminal electrodes are connected to the first lead, while the second and fourth terminal electrodes are connected to the second lead; and
wherein a current flow through the first capacitor section in a differential mode is directed opposite to a current flow through the second capacitor section in the differential mode.

2. The multilayer capacitor array mounting structure according to claim 1, wherein the first and third terminal electrodes are disposed on the same side face of the capacitor element body.

3. The multilayer capacitor array mounting structure according to claim 1, wherein the first and second terminal electrodes are disposed on the same side face of the capacitor element body.

4. The multilayer capacitor array mounting structure according to claim 1, wherein the first and second capacitor sections have the same capacitance.

5. The multilayer capacitor array mounting structure according to claim 1, wherein the capacitor element body further has fifth and sixth inner electrodes;
wherein the multilayer capacitor array further comprises a fifth terminal electrode disposed on the outer surface of the capacitor element body and connected to the fifth inner electrode, and a sixth terminal electrode disposed on the outer surface of the capacitor element body and connected to the sixth inner electrode;
wherein the fifth and sixth inner electrodes form a third capacitor section having a capacitance different from that of the first capacitor section in the multilayer capacitor array; and
wherein the fifth terminal electrode is connected to the first lead, while the sixth terminal electrode is connected to the second lead.

6. The multilayer capacitor array mounting structure according to claim 1, wherein a current flow through the first capacitor section in a common mode is directed in a same direction as a current flow through the second capacitor section in the common mode.

7. The multilayer capacitor array mounting structure according to claim 1, wherein the capacitor element body is formed by laminating insulator layers, and the first capacitor section and the second capacitor section are formed in a substantially same position in a laminating direction of the insulator layers.

8. The multilayer capacitor array mounting structure according to claim 1, wherein the capacitor element body includes insulator layers, and a set of the first, second, third and fourth inner electrodes is disposed on one or two insulator layers.

9. The multilayer capacitor array mounting structure according to claim 1, wherein the multilayer capacitor array is connected in parallel with a device to which the power lines supply a current.

10. A mounting structure comprising:
a circuit board;
a pair of power lines for supplying a current to a device;
first leads connecting to the pair of power lines, said first leads formed with the circuit board;
a second lead for grounding, said second lead formed with the circuit board: and
a multilayer capacitor array including a capacitor element body having first, second, third, and fourth inner electrodes, a first terminal electrode disposed on an outer surface of the capacitor element body and connected to the first inner electrode, a second terminal electrode disposed on the outer surface of the capacitor element body and connected to the second inner electrode, a third terminal electrode disposed on the outer surface of the capacitor element body and connected to the third inner electrode, and a fourth terminal electrode disposed on the outer surface of the capacitor element body and connected to the fourth inner electrode;

wherein, in the multilayer capacitor array, the first and second inner electrodes form a first capacitor section, while the third and fourth inner electrodes form a second capacitor section;

wherein the first and third terminal electrodes are connected to the first leads, while the second and fourth terminal electrodes are connected to the second lead; and wherein a current flow through the first capacitor section in a differential mode is directed opposite to a current flow through the second capacitor section in the differential mode.

11. The mounting structure according to claim 10, wherein the first and third terminal electrodes are disposed on the same side face of the capacitor element body.

12. The mounting structure according to claim 10, wherein the first and second terminal electrodes are disposed on the same side face of the capacitor element body.

13. The mounting structure according to claim 10, wherein the first and second capacitor sections have a same capacitance.

14. The mounting structure according to claim 10, wherein the capacitor element body further has fifth and sixth inner electrodes;

wherein the multilayer capacitor array further includes a fifth terminal electrode disposed on the outer surface of the capacitor element body and connected to the fifth inner electrode, and a sixth terminal electrode disposed on the outer surface of the capacitor element body and connected to the sixth inner electrode;

wherein the fifth and sixth inner electrodes form a third capacitor section having a capacitance different from that of the first capacitor section in the multilayer capacitor array; and wherein the fifth terminal electrode is connected to one of the first leads, while the sixth terminal electrode is connected to the second lead.

15. The mounting structure according to claim 10, wherein a current flow through the first capacitor section in a common mode is directed in a same direction as a current flow through the second capacitor section in the common mode.

16. The mounting structure according to claim 10, wherein the capacitor element body is formed by laminating insulator layers, and the first capacitor section and the second capacitor section are formed in a substantially same position in a laminating direction of the insulator layers.

17. The mounting structure according to claim 10, wherein the capacitor element body includes insulator layers, and a set of the first, second, third and fourth inner electrodes is disposed on one or two insulator layers.

18. The mounting structure according to claim 10, wherein the multilayer capacitor array is connected in parallel with the device to which the pair of power lines supply a current.

* * * * *